(12) United States Patent
Field et al.

(10) Patent No.: US 6,253,324 B1
(45) Date of Patent: Jun. 26, 2001

(54) SERVER VERIFICATION OF REQUESTING CLIENTS

(75) Inventors: Scott Field, Renton; Matthew W. Thomlinson; Allan Cooper, both of Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/996,637

(22) Filed: Dec. 23, 1997

Related U.S. Application Data

(63) Continuation-in-part of application No. 08/884,864, filed on Jun. 30, 1997.

(51) Int. Cl.[7] .................................. G06F 9/78; G06F 9/36
(52) U.S. Cl. ............................................. 713/187; 713/188
(58) Field of Search ........................... 380/3, 4; 713/187, 713/188

(56) References Cited

U.S. PATENT DOCUMENTS

| | | | | |
|---|---|---|---|---|
| 4,919,545 | * | 4/1990 | Yu ........................................... | 713/167 |
| 5,050,212 | * | 9/1991 | Dyson ..................................... | 380/25 |
| 5,202,923 | * | 4/1993 | Kuriyama ............................... | 380/50 |
| 5,214,700 | * | 5/1993 | Pinkas et al. .......................... | 713/156 |
| 5,220,603 | * | 6/1993 | Parker .................................... | 713/156 |
| 5,224,160 | * | 6/1993 | Paulini et al. ............................ | 380/4 |
| 5,235,642 | * | 8/1993 | Wobber et al. ........................ | 713/156 |
| 5,276,444 | * | 1/1994 | McNair ............................ | 340/825.33 |
| 5,530,757 | * | 6/1996 | Krawczyk ............................... | 380/23 |
| 5,560,008 | * | 9/1996 | Johnson et al. ........................ | 713/201 |
| 5,625,693 | * | 4/1997 | Rohatgi et al. .......................... | 380/23 |
| 5,757,915 | * | 5/1998 | Aucsmith et al. ...................... | 380/25 |
| 5,818,936 | * | 10/1998 | Mashayekhi .......................... | 713/167 |
| 5,835,727 | * | 11/1998 | Wong et al. ........................... | 709/238 |
| 5,881,151 | * | 3/1999 | Yamamoto ............................... | 380/4 |
| 5,881,152 | * | 3/1999 | Moos ...................................... | 380/4 |
| 5,935,249 | * | 8/1999 | Stern et al. ............................ | 713/201 |
| 5,970,145 | * | 10/1999 | McManis ................................ | 380/23 |
| 5,978,484 | * | 11/1999 | Apperson et al. ...................... | 380/25 |
| 6,049,877 | * | 4/2000 | White ..................................... | 713/201 |

FOREIGN PATENT DOCUMENTS

| | | | |
|---|---|---|---|
| 0 442 839 A3 | 1/1991 | (EP) | .................................. G06F/1/00 |
| 0 456 386 A2 | 4/1991 | (EP) | .................................. G06F/1/00 |
| 0 717 339 A2 | 11/1995 | (EP) | .................................. G06F/1/00 |
| 0 820 017 A2 | 3/1997 | (EP) | .................................. G06F/12/14 |

\* cited by examiner

*Primary Examiner*—James P Trammell
*Assistant Examiner*—James W. Myhre
(74) *Attorney, Agent, or Firm*—Lee & Hayes, PLLC

(57) ABSTRACT

Described herein is a method of verifying the integrity of client programs that request services from server programs. The invention includes a step of accepting a request for services from a client program, wherein the client program executes from an executable image in executable memory. In response to such a request, the server program identifies one or more image files on secondary storage corresponding to non-writeable sections of the executable image. The server program then compares the non-writeable sections of the executable image with the corresponding sections of the image files to determine whether the executable image has been altered in the executable memory. The server program provides the requested services only if the executable image of the client program has not been altered.

26 Claims, 3 Drawing Sheets

SERVER VERIFICATION OF REQUESTING CLIENTS

RELATED APPLICATIONS

This application is a continuation-in-part of a U.S. patent application entitled "Protected Storage of Core Data Secrets"; Ser. No. 08/884,864; by inventors Matthew W. Thomlinson, Scott Field, and Allan Cooper; filed Jun. 30, 1997, hereby incorporated by reference.

TECHNICAL FIELD

This invention relates to client/server computer applications and to methods of preventing unauthorized clients or clients that have been tampered with from utilizing services of security-sensitive computer programs.

BACKGROUND OF THE INVENTION

Increasingly, personal computers are being used to store sensitive information and to perform sensitive transactions such as financial transactions. This has increased the need for securing such computers against unauthorized use and access. However, it is also becoming much more common for personal computers to be connected to public networks such as the Internet. This latter trend has increased the potential for unauthorized access to personal computer data and executable components.

One common way to interfere with operations of a computer is to infect it with a so-called "virus." A computer virus is an executable component that either masquerades as some legitimate and desirable program or that attaches itself to a legitimate program. Although many viruses are simply destructive, carefully designed viruses can potentially be used to actively perform unauthorized fraudulent operations on a personal computer. With the common connection of computers to the Internet, it is quite possible for a virus to read sensitive data from a personal computer and transmit it to some third party over the Internet. It is also possible for a virus to perform financial transactions on behalf of a user. For example, a virus or other maliciously-designed program component might obtain a credit card number from the user's computer, and then call executable components within the user's computer to order merchandise with the stolen credit card number.

U.S. patent application Ser. No. 08/884,864, noted above, describes an architecture for storing and protecting a user's data secrets such a passwords, PINs (personal identification numbers), credit card numbers, etc. The architecture includes a server program that provides services to requesting client programs. These services include securely storing data secrets for requesting clients. A particular client can submit data to be safeguarded, and can subsequently request that same data. The data can also be returned to other clients, based on criteria specified by the user or by the client that originally submitted the data. For instance, a client might specify that data is to be returned to any client having a valid cryptographic certificate signed by a particular authority.

Using an architecture such as this, there is a danger that a given program might submit data for safekeeping, and that an imposter program might then request that information. Various measures are available to thwart such an attack. One method of protection is to require user authentication (such as password entry or insertion of a hardware token) before surrendering any sensitive data to a requesting program. However, this tactic alone does not protect against some types of attacks. For instance, a hostile program might be designed to appear and act just like a legitimate program, while performing its hostile actions behind the scenes. Thus, the user might be fooled into providing authentication in response to requests by a hostile program.

Another method of protection is to install an anti-virus program or some other means of verifying the integrity of on-disk program images. This method either detects known viruses or verifies that program files have not been tampered with since their original installation on a user's hard disk. A program for performing this task runs either continuously or periodically to examine image files on a user's computer. In addition, a verification can be performed before loading any program into executable memory. When using methods such as these, a user can usually assume that all programs on the computer's hard disk are legitimate, authorized, non-virus applications.

Still, there is a possibility that a hostile program module might attach itself to a legitimate program after the legitimate program is loaded from disk into executable memory. Specifically, an attacking program might modify the memory image of a legitimate application program in order to alter its execution, and to thereby gain access to sensitive information or to perform unauthorized actions on behalf of the user.

The inventors have developed a way to detect and subsequently prevent such an attack.

SUMMARY OF THE INVENTION

The invention includes a client program that requests services from a server program. Before performing services for a particular client program, the server program insists that the client program identify itself. The server program then analyzes both the image file of the client program on secondary storage and the executable image of the client program in executable memory. The server program first verifies the integrity of the image file, and then compares non-writeable sections of the executable image with the verified image file. The comparison preferably comprises performing a hash on portions of both the image files and the executable image, and then comparing the resulting hash values. The server program provides the requested services to the client program only if both the image file and the executable image can be verified.

DETAILED DESCRIPTION

Figure 1:
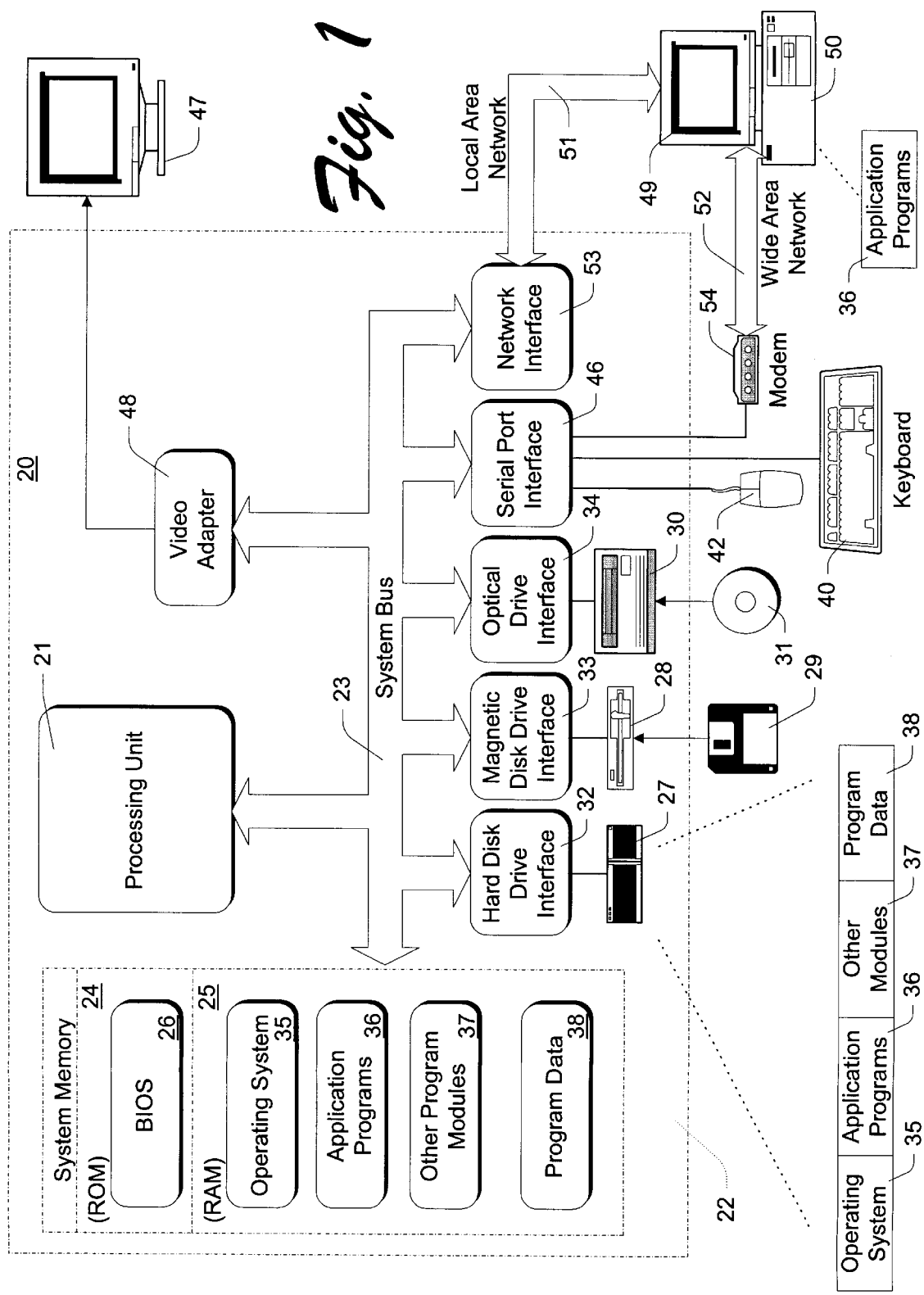
FIG. 1 is a block diagram of an exemplary computer system suitable for implementing the invention.

FIG. 1 and the following discussion are intended to provide a brief, general description of a suitable computing environment in which the invention may be implemented. Although not required, the invention will be described in the general context of computer-executable instructions, such as programs and program modules, that are executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

RAM 25 forms executable memory, which is defined herein as addressable memory from which a microprocessor accesses sequential addresses to retrieve and execute instructions. This memory can also be used for storing data. In many operating systems, executable memory includes virtual memory. Executable memory is generally volatile, meaning that it loses its contents when power is cycled.

Computer 20 also has secondary, non-volatile memory, primarily in the form of magnetic disk 29. A computer's secondary memory is often used for long-term storage of data and programs, and to expand virtual memory beyond the actual size of physical memory. Secondary memory is usually not directly addressable by a microprocessor in the same way that executable memory is addressable. Rather, a microprocessor must execute specially written code from executable memory in order to read from or write to secondary storage. Secondary memory includes local devices such as hard disks, but can also include remote storage devices accessible through networks.

A number of programs and/or program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces such as described in Brockschmidt, Kraig; *Inside OLE* 2; Microsoft Press, 1994, which is hereby incorporated by reference.

Recent Windows operating systems utilize what is referred to as the Win32 API: a well-defined set of interfaces that allow application programs to utilize functionality provided by the Windows operating systems. The Win32 API is documented in numerous texts, including Simon, Richard; *Windows 95 Win32 Programming API Bible*; Waite Group Press, 1996, which is hereby incorporated by reference. General familiarity with this type of programming is assumed throughout the following discussion.

Figure 2:
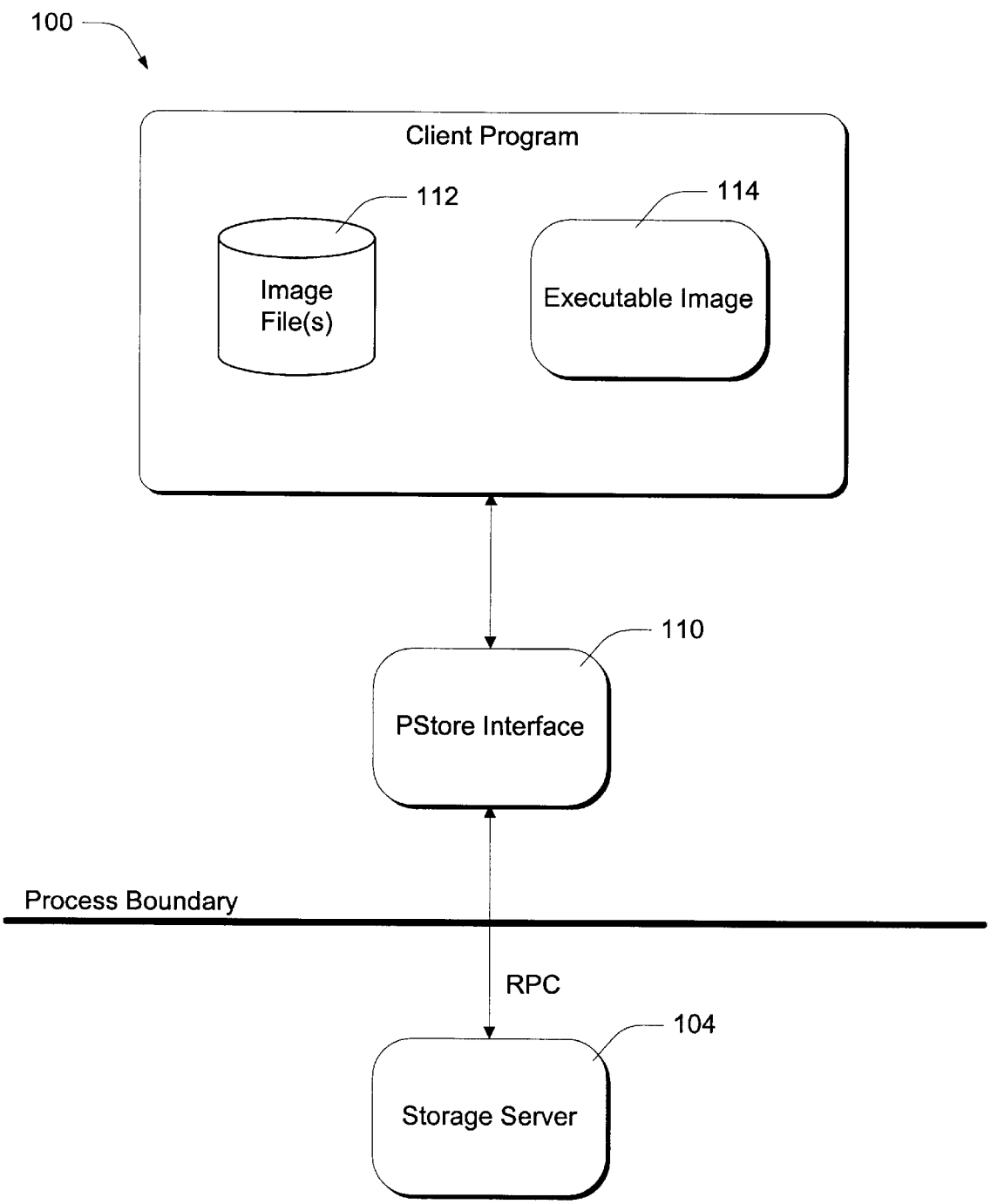
FIG. 2 is a block diagram of a server program and a requesting application program in accordance with the invention.

FIG. 2 shows architectural components of a protected storage system 100 in accordance with the invention for storing data items and for protecting them from unauthorized access. The protected storage system allows application programs to securely store data items that must be kept private and free from tampering. Such data items might include cryptographic keys, passwords, financial information, trust profiles, etc. The storage system is designed to hold small items of core secret data in a central and common storage location; if a lot of data is to be protected, a bootstrap secret (such as an encryption key) may be stored in the storage system rather than the data itself. This enables data items to be moved when appropriate to small, secure hardware devices such as smart cards, and also avoids unnecessary overhead which would otherwise be required to secure large data items.

The protected storage system is executed by a computer such as described above with reference to FIG. 1. Application programs, such as application program 102 shown in FIG. 2, are also executed by the computer. For purposes of this description, these application programs are referred to as client programs.

Storage system 100 also includes a storage server program 104 that provides services to requesting client programs. Generally, the storage server receives data items from client programs, securely stores and/or encrypts the data items, and returns such data items in response to requests from authorized application programs. The storage server also performs authentication and verification procedures with respect to the requesting application programs, as will be explained in more detail below.

To increase security, the storage server is implemented in a different address space than the calling application programs. Communications across the process or address space boundary take place using remote procedure calls (RPCs). Such calls can be made when operating under Windows operating systems and other operating systems. The functionality and formatting of RPC calls is documented in the Microsoft Win32 Software Development Kit.

Although application programs can make RPC calls directly, this complexity is avoided by providing a dynamically linked library (DLL) that can be executed in the application programs' address spaces. This library, referred to as the PStore Interface 110 in FIG. 2, implements a plurality of interfaces and associated methods that can be called by application programs to exploit the full functionality of the storage server. The interfaces include methods for creating and reading data items, as well as other useful functions. The interfaces and methods in the described embodiment are implemented using the COM (component object model) interfaces of the Windows operating system.

As is common with applications executing under an operating system, each application program is stored in one or more corresponding image files 112 residing on secondary storage. Under Windows operating systems, these image files are formatted in accordance with a standard known as the Common Object File Format (COFF). A COFF file has a plurality of sections, each containing some portion of the executable image of a program. In addition, the COFF file has information that allows the sections to be appropriately positioned and arranged in executable memory for execution by a computer. When a particular program is to be executed, an operating system loader reads the COFF file, loads its various sections into their correct locations in executable memory to form an executable image 114, and initiates execution of the executable image 114.

A program or program module can be written either to execute from a fixed base address or from a variable base address that is determined when the program is loaded into executable memory. A program module having a variable base address is referred to as a relocatable module, having relocatable code. Relocatable code uses static pointers that are dependent on the actual base address at which the program is loaded. Generally, such code has a preferred base or load address, and the static pointers have values appropriate for this preferred address. If a different base address is used, however, each of the static pointers is changed by the program loader as the code is loaded into executable memory. The COFF file includes information that allows the loader to identify each of the static pointers and to modify them as appropriate. This process is commonly referred to as "fixing up" the relocatable code before it is loaded into executable memory.

Although the described embodiment of the invention is used in context of the storage server described above, the invention is useful in more general client/server situations, in which there are one or more client programs configured to request services from a server program. Thus, the description below is given in this general context of a server program and a client program. It is assumed that both programs are executing concurrently on a given computer, that each client program comprises one or more image files located on secondary storage and a corresponding executable image in executable memory, and that the executable image has previously been loaded from the image file(s) of the client program.

The invention allows a server program to withhold services from clients whose code integrity cannot be verified. Thus, before providing services to a requesting client, the server program verifies that client programs are who they say they are, and that they have not been tampered with either on disk or in executable memory. This process is referred to herein as client identification and verification. In the described embodiment, identification is performed by an identification module, and verification is performed by an enforcement module.

The identification module is responsible for interrogating the client program that is calling the server program. In order to identify a client process associated with a request, the following steps occur:

1. The client program identifies itself to the server, presenting its process ID and thread handle. The client program obtains its process ID using the GetCurrentProcessld( ) system API call. The client program obtains a thread handle using the GetCurrentThread( ) and DuplicateHandle( ) system API calls.
2. The client program makes a service request, passing the process ID and thread handle to the server.
3. The server program opens a handle to the client process by submitting the process ID in a call to the system API function OpenProcess( ). The server program saves this process handle for later use.
4. The server program duplicates the client thread handle from the client process to the server process, using the DuplicateHandle( ) system API call. The duplication source process handle used in this call is that obtained from steps 1 & 2, and the destination process handle is obtained from the GetCurrentProcess( ) system API call. The duplication source object used in the DuplicateHandle( ) call is the thread handle obtained from the client in steps 1 & 2. (note: this duplication step is required because handle values are not valid across process boundaries).
5. The server uses the process handle obtained above to analyze the executable image associated with the client program. The server program also uses the handle to query the underlying operating system about what executable modules are present in the executable image, in addition to determining module load addresses. The exact method used to query the operating system varies depending on the operating system. In the Windows NT operating system, a system call named NTQueryInformationProcess( ) retrieves a linked list of loaded modules (DLLs, OCX files, and other executable modules), along with the names and file paths of their image files and the base addresses in executable memory where the corresponding image files have been loaded.

6. The server now has a complete list of modules associated with the client, and uses it to analyze the call stack associated with the thread handle obtained above. The StackWalk( ) system API call is utilized to determine the chain of callers associated with the client program. Each of these callers is subject to the verification steps described below.

The verification module uses results provided by the identification module in performing two verifications. First, the verification module verifies that the on-disk image file(s) corresponding to the client program have not been tampered with on disk. Second, the verification module verifies that the image file(s) match the executable image of the client program in executable memory.

The first verification can be accomplished by storing a cryptographic representation of the image file(s) corresponding to any client programs for which services are to be provided. This cryptographic representation is stored by the server program. There are at least two alternative cryptographic representations of an image file:

A cryptographic hash. When a client program identifies itself to the server program, the image file(s) of the client program are read and subjected to an SHA-1 cryptographic hash. The resulting hash value is stored by the server program. When subsequent services are requested by the client, the hash is recomputed against the current image file(s) of the client program, and this hash is compared to the stored hash. If the two hashes compare correctly, the on-disk image files are assumed to be authentic.

Public key certificate-based validation. This alternative uses Microsoft Authenticode calls to verify that an image file has not been tampered with. Authenticode handles hashing the image file internally. This cryptographic representation of the file is more flexible, because it also supports validation against various fields in the certificate attached to the specified file.

In addition to or alternatively to these techniques for verifying on-disk image files, an anti-virus program can be installed to continuously or periodically verify disk image files. An anti-virus program compares image files against characteristics of known viruses, thus providing some degree of protection against hostile program modules.

The second verification step is to ensure that executable images in executable memory match the verified on-disk image files. Generally, the server program is configured to identify the one or more image files corresponding to the executable image of the requesting client program, and to compare the executable image with the identified image files to determine whether the executable image has been altered in the executable memory. This is not a direct comparison, since the COFF image file format does not have a simple byte-to-byte correspondence with its in-memory executable image. Rather, the verification module performs many of the steps performed by the operating system loader, in order to create a copy of the executable image represented by the corresponding image file(s). The server program provides requested services to the requesting client program only if the executable image of the requesting client program has not been altered in comparison to the on-disk image file.

In more detail, the second verification step is performed as follows:

1. Any COFF image files corresponding to the requesting client are "mapped" into the server program's address space, using the CreateFileMapping( ) and MapViewOfFile( ) system API calls. This creates copies of the on-disk image file(s) in primary memory, making it much easier to access and manipulate data within the file(s).

2. The verification module loops through the header of the in-memory copies of the COFF file(s), identifying any read-only or non-writeable sections such as code sections, resource sections, and read-only data sections. It then creates an SHA-1-based cryptographic hash value based on the identified non-writeable sections.

3. The process handle obtained from the identification module is now used to read the memory address space where the executable image of the requesting client program is loaded. This is accomplished by using the ReadProcessMemory( ) system call. Non-writeable sections of the executable image, corresponding to the non-writeable sections of the image files as identified above, are read and used as the basis of a second cryptographic hash value. As the data of each section is read, any fixups previously applied to static pointers are "undone" so that the values used in the hash match the values in the preferred address representation of the image file(s). The image file(s) are used to obtain the locations of static pointers within the executable image that have been the subject of fixups. Each such static pointer is modified by subtracting a value equal to the preferred load address of the image minus the actual load address of the image.

4. The verification module then compares the two hashes resulting from the immediately preceding steps. If they match, the executable image in memory has not been tampered with, and the server program provides whatever services have been requested of it by the client program.

Figure 3:
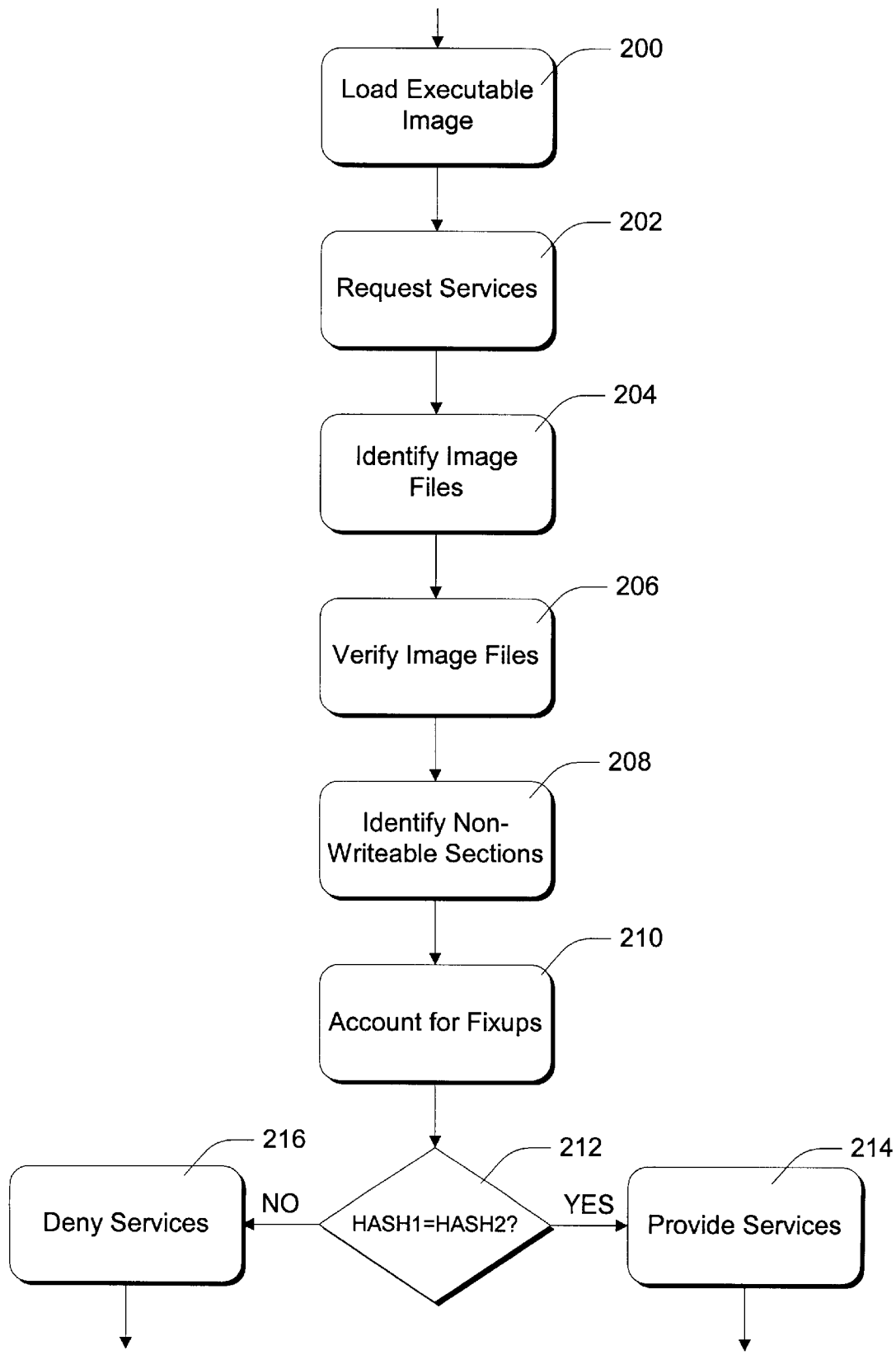
FIG. 3 is a flowchart illustrating a method of verifying the integrity of client programs that request services from server programs.

The general steps described above are illustrated in FIG. 3. A step 200 comprises creating an executable image of a client program and initiating execution of the executable image. The executable image is created in executable memory from one or more storage files on secondary storage that correspond to the client program. This step is performed by a program loader that is usually associated with an operating system.

Step 202 comprises requesting services of a server program from the client program. Such services are requested through the Pstore interfaces described above.

Step 204 comprises identifying the one or more on-disk image files corresponding to the client program. This step is performed by the server program using the NTQueryInformationProcess( ) system call as discussed above to obtain a linked list of loaded modules along with the names and file paths of their image files on secondary storage.

Step 206 comprises verifying the integrity of the one or more image files, using a cryptographic hash, public key certificate-based validation, an anti-virus program, or some combination of these techniques.

Step 208 comprises identifying non-writeable sections of the executable image, based on the information given in the on-disk COFF image file(s).

Step 210 comprises accounting for relocation fixups in the executable image by undoing the relocation fixups for purposes of the following steps—the "undone" fixups are not written back to the executable image itself.

Step 212 comprises comparing the executable image of the client program with the image files corresponding to the client program to determine whether the executable image has been altered in the executable memory, using the undone relocation fixups. Only the non-writeable sections of the executable image are compared. The comparison is preferably accomplished by hashing at least portions of the executable image to create a first hash value; hashing at least corresponding portions of the one or more storage files to create a second hash value; and comparing the first and second hash values.

Step 214 comprises providing requested services to the client program from the server program. This step is performed only if the result of step 212 is true. Otherwise, the requested services are denied as indicated by block 216.

The invention provides an effective way of verifying the integrity of application programs at a point in time after their initial loading. This fulfills a particular need in client/server applications, where a server needs to verify requesting clients before providing services to those clients.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of providing services to client programs that execute on a computer, the computer having executable memory and secondary storage, the method comprising:

accepting a request for services from a client program, wherein the client program executes from an executable image in executable memory, and wherein the executable image has previously been loaded into executable memory from one or more image files that reside on the secondary storage;

comparing the executable image with said one or more image files to determine whether the executable image has been altered in the executable memory;

providing the requested services to the client program only if the executable image of the client program has not been altered.

2. A method as recited in claim 1, further comprising identifying non-writeable sections of the executable image, wherein the comparing step compares only the non-writeable sections of the executable image with the one or more image files.

3. A method as recited in claim 1, wherein comparing the executable image with said one or more image files comprises:

hashing at least portions of the executable image to create a first hash value;

hashing at least portions of the one or more image files to create a second hash value;

comparing the first and second hash values.

4. A method as recited in claim 1, wherein comparing the executable image with said one or more image files comprises accounting for relocation fixups in the executable image.

5. A method as recited in claim 1, wherein comparing the executable image with said one or more image files comprises undoing relocation fixups in the executable image.

6. A method of providing services to client programs that execute on a computer, the computer having executable memory and secondary storage, the method comprising:

accepting a request for services from a client program, wherein the client program executes from an executable image in executable memory;

identifying one or more image files on the secondary storage corresponding to non-writeable sections of the executable image;

comparing the non-writeable sections of the executable image with the corresponding one or more image files to determine whether the executable image has been altered in the executable memory;

providing the requested services to the client program only if the executable image of the client program has not been altered.

7. A method as recited in claim 6, wherein comparing the non-writeable sections of the executable image comprises:

hashing the non-writeable sections of the executable image to create a first hash value;

hashing the program module files corresponding to the non-writeable sections of the executable image to create a second hash value;

comparing the first and second hash values.

8. A method as recited in claim 6, wherein comparing the non-writeable sections of the executable image comprises accounting for relocation fixups in the executable image.

9. A method as recited in claim 6, wherein comparing the non-writeable sections of the executable image comprises undoing relocation fixups in the executable image.

10. A method of providing services to client programs that execute on a computer, the computer having executable memory and secondary storage, the method comprising:

creating an executable image of a client program in executable memory from one or more image files on secondary storage corresponding to the client program;

requesting services of a server program from the client program;

identifying the one or more image files corresponding to the client program;

comparing the executable image of the client program with the image files corresponding to the client program to determine whether the executable image has been altered in the executable memory;

providing the requested services from the server program only if the executable image of the client program has not been altered.

11. A method as recited in claim 10, further comprising identifying non-writeable sections of the executable image, wherein comparing the executable image of the client program comprises comparing only the non-writeable sections of the executable image with the one or more image files.

12. A method as recited in claim 10, wherein comparing the executable image of the client program comprises:

hashing at least portions of the executable image to create a first hash value;

hashing at least portions of the one or more image files to create a second hash value;

comparing the first and second hash values.

13. A method as recited in claim 10, wherein comparing the executable image of the client program comprises a step of accounting for relocation fixups in the executable image.

14. A method as recited in claim 10, wherein comparing the executable image of the client program comprises undoing relocation fixups in the executable image.

15. A method as recited in claim 10, further comprising verifying the integrity of the one or more image files.

16. A computer comprising:

executable memory;

non-volatile secondary storage;

the computer being configured to execute a server program that provides services to requesting client programs;

the computer being further configured to load an executable image of a client program into executable memory from one or more corresponding image files on secondary storage, the client program being configured to request services from the server program;

the server program being configured to identify the one or more image files corresponding to the executable image of the requesting client program and to compare the executable image with the identified image files to determine whether the executable image has been altered in the executable memory;

wherein the server program is further configured to provide the requested services to the requesting client program only if the executable image of the requesting client program has not been altered.

17. A computer as recited in claim 16, wherein the server program compares only non-writeable sections of the executable image with the identified image files.

18. A computer as recited in claim 16, wherein the server program performs the following acts to compare the executable image with the identified image files:

hashing at least portions of the executable image to create a first hash value;

hashing at least portions of the one or more image files to create a second hash value;

comparing the first and second hash values.

19. A computer as recited in claim 16, wherein the server program accounts for image relocation fixups when comparing the executable image with the identified image files.

20. A computer as recited in claim 16, wherein the server program undoes relocation fixups in the executable image when comparing the executable image with the identified image files.

21. A computer as recited in claim 16, further comprising an anti-virus program running on the computer to ensure the integrity of the one or more image files.

22. A computer-readable storage medium containing a server program that provides services to requesting client programs, the server program being executable by a computer to perform acts comprising:

accepting a request for services from a client program, wherein the client program executes from an executable image in executable memory, and wherein the executable image has previously been loaded into executable memory from one or more image files that reside on the secondary storage;

comparing the executable image with said one or more image files to determine whether the executable image has been altered in the executable memory;

providing the requested services to the client program only if the executable image of the client program has not been altered.

23. A computer-readable storage medium as recited in claim 22, the server program being executable to perform a further act comprising identifying non-writeable sections of the executable image, wherein the comparing act compares only the non-writeable sections of the executable image with the one or more image files.

24. A computer-readable storage medium as recited in claim 22, wherein the comparing act comprises:

hashing at least portions of the executable image to create a first hash value;

hashing at least portions of the one or more image files to create a second hash value;

comparing the first and second hash values.

25. A computer-readable storage medium as recited in claim 22, wherein the comparing act includes a step of accounting for relocation fixups in the executable image.

26. A computer-readable storage medium as recited in claim 22, wherein the comparing act includes a step of undoing relocation fixups in the executable image.

* * * * *